United States Patent [19]
Keller

[11] Patent Number: 5,349,389
[45] Date of Patent: Sep. 20, 1994

[54] VIDEO ATTENUATOR WITH OUTPUT COMBINED WITH SIGNAL FROM NON-LINEAR SHUNT BRANCH TO PROVIDE GAMMA CORRECTION AND HIGH FREQUENCY DETAIL ENHANCEMENT

[75] Inventor: Anton W. Keller, Zurich, Switzerland

[73] Assignee: RCA Thomson Licensing Corporation, Princeton, N.J.

[21] Appl. No.: 48,649

[22] Filed: Apr. 14, 1993

[51] Int. Cl.⁵ .............................................. H04N 5/20
[52] U.S. Cl. .................................. 348/625; 348/676
[58] Field of Search ............... 358/162, 164, 166, 169, 358/34, 35, 27, 904; H04N 5/20, 5/202, 5/205, 5/14, 5/208, 9/69

[56] References Cited

U.S. PATENT DOCUMENTS

| | | | |
|---|---|---|---|
| 3,047,656 | 7/1962 | Suhrmann et al. | 358/164 |
| 3,588,338 | 6/1971 | Dischert | 358/164 |
| 4,558,363 | 12/1985 | Sugimoto | 358/164 |
| 5,083,198 | 1/1992 | Haferl et al. | 358/32 |

FOREIGN PATENT DOCUMENTS

| | | | |
|---|---|---|---|
| 0124017 | 10/1978 | Japan | 358/164 |
| 0026970 | 2/1982 | Japan | 358/162 |
| 0214973 | 9/1991 | Japan | H04N 5/208 |

*Primary Examiner*—James J. Groody
*Assistant Examiner*—David E. Harvey
*Attorney, Agent, or Firm*—Joseph S. Tripoli; Peter M. Emanuel; Richard G. Coalter

[57] ABSTRACT

A video input signal is applied to a bridged-T attenuator which includes a non-linear element in the shunt branch thereof that provides increasing attenuation as the input signal increases to thereby produce a gamma corrected video output signal at the attenuator output. A current sensor in the shunt branch generates an exponentially increasing detail signal for increases in the video input signal. The detail signal is high pass filtered and combined with the gamma corrected signal by a summing circuit for providing a video output signal having gamma correction and high frequency detail augmentation.

11 Claims, 4 Drawing Sheets

VIDEO ATTENUATOR WITH OUTPUT COMBINED WITH SIGNAL FROM NON-LINEAR SHUNT BRANCH TO PROVIDE GAMMA CORRECTION AND HIGH FREQUENCY DETAIL ENHANCEMENT

FIELD OF THE INVENTION

This invention relates to television systems generally and particularly to apparatus for providing non-linear processing of video signals.

BACKGROUND OF THE INVENTION

In an ideal television system the light output produced by a kinescope would be linearly related to the light applied to a camera pick-up tube. However, in practical systems, the camera tube and the display tube are both non-linear devices, and the overall camera/display net "gamma" (which represents the curvature of the transfer function) differs from a value of unity which would be necessary for linear response.

The non-linearities, if uncorrected, would tend to reduce the contrast and to make detail in dark picture areas almost invisible while the whites would tend to be amplified to the point of picture tube saturation and blooming. Correction of non-linearities (i.e., gamma correction) requires non-linear processing of the video signal to be displayed.

SUMMARY OF THE INVENTION

The present invention is directed to meeting the need for non-linear video signal processing apparatus providing gamma correction and having reduced complexity.

Non-linear video signal processing apparatus embodying the invention comprises a source for providing a video input signal to be processed and an attenuator, having a linear branch and a non-linear branch. The non-linear branch attenuates the video input signal as a function of the level of the video input signal for producing a variably attenuated video signal. The linear branch couples the input signal to a summing circuit which also receives the variably attenuated signal, the summing circuit having an output for producing a gamma corrected video output signal.

In accordance with a further feature of the invention, the non-linear branch includes a sensing element for sensing shunt branch current and producing a sensed video signal having an exponential response to the video input signal. The sensed video signal is applied to a high pass filter for providing a high frequency boosted detail signal of variable amplitude which is applied to the summing circuit for enhancing high frequency detail of said gamma corrected video output signal.

A method, in accordance with the invention, for providing both gamma correction and detail enhancement of a video input signal comprises the steps of attenuating the video input signal as a function of the level of the video input signal for producing a gamma corrected video output signal; sensing a parameter of the video input signal for generating a detail indicating video signal having an amplitude which increases as a non-linear function of the level of the video input signal; high pass filtering the detail indicating signal for providing a high frequency boosted detail signal; and summing the video input signal, the gamma corrected video signal and the high frequency boosted detail signal for producing a processed video output signal having gamma correction and high frequency boosted detail.

BRIEF DESCRIPTION OF THE DRAWINGS

The foregoing and further features of the invention are illustrated in the accompanying drawing, wherein.

DETAILED DESCRIPTION

Figure 1:
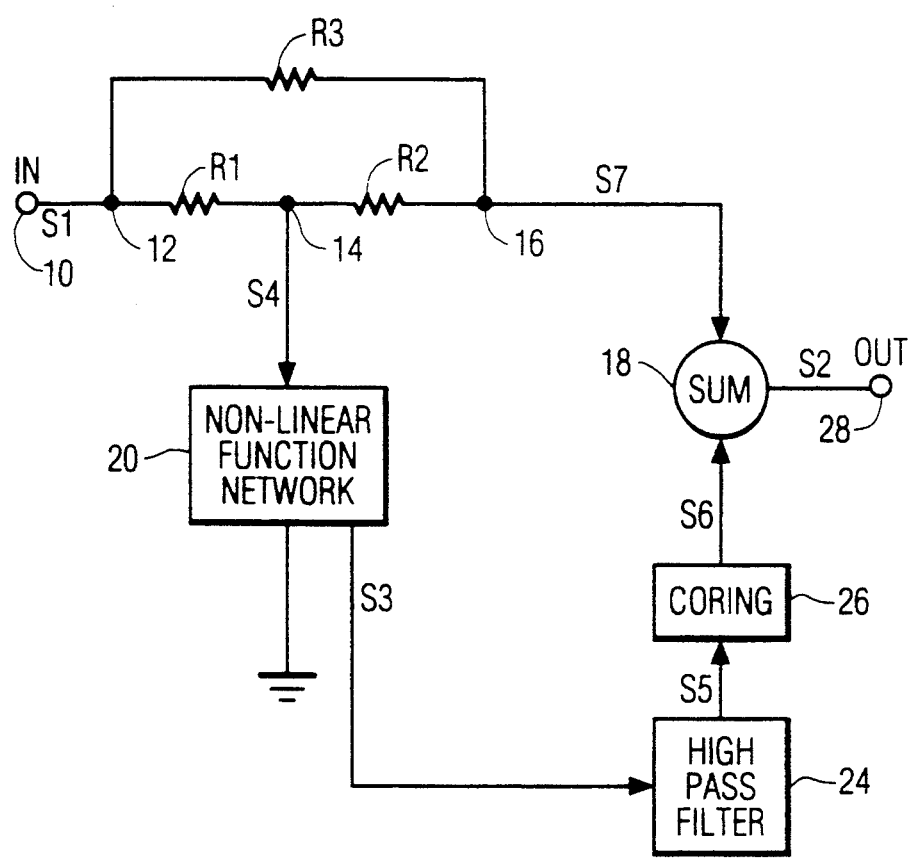
FIG. 1 is a simplified block diagram of a non-linear video signal processor embodying the invention.

As an overview, the non-linear processor of FIG. 1 includes a non-linear function network 20 in the shunt branch of a bridged-T attenuator. Advantageously, the non-linear function network 20 provides the dual functions of:

(1) increasing the bridged-T attenuation as a function of the amplitude of the video input signal so as to provide gamma correction to the video output signal; and (2) providing a sensed video signal that is exponentially related to the amplitude of the video input signal for use in enhancing the high frequency detail of the gamma corrected video output signal.

In more detail, the non-linear processor of FIG. 1 includes an input terminal 10 for receiving a video input signal S1 and an output terminal 28 for providing a processed video output signal S2 having gamma correction and high frequency detail enhancement. The bridged-T attenuator includes an input node 12 that is coupled to input terminal 10 and, via a first resistor R1 to a central node 14 which is coupled via a second resistor R2 to the output node 16. The bridging resistor R3, coupled between nodes 12 and 16, determines the maximum attenuation of the attenuator and the influence of the non-linear function network attached to the central node 14. More specifically, bridging resistor R3 actually limits the amount of non-linearity because R3 is a linear by-pass. If resistor R3 is equal to the sum of the T resistors R1 and R2, then the maximum attenuation reached will be 6 dB. Increasing the value of the bridging resistor R3 will increase the maximum value of the attenuation provided. Further increases in the value of the bridging resistor will result in further increaseds in the maximum value of the attenuation and, in the limiting case, the bridging resistor R3 may be removed to obtain the highest level of video signal attenuation. Accordingly, the T-resistors R1 and R2, in relation to the bridging resistor R3, determine the attenuation range. The value of the attenuation is controlled as a function of the video signal amplitude by means of the non-linear function network 20 coupled between the central node 14 and a point of reference potential (illustrated here as ground).

As the value of the video input signal increases, the impedance of network 20 decreases thus shunting more and more of the input signal to ground. Accordingly, for relatively small input signals the attenuation is also small and the output signal is substantially equal in magnitude to the input signal. Thus, signals near black level suffer little loss. However, as the input signal increases towards white level the attenuation also increases. Accordingly, the whiter the signal gets the more the attenuation it receives and so the transfer function exhibits a negative slope thereby applying gamma correction to the processed video output signal.

Figure 3:
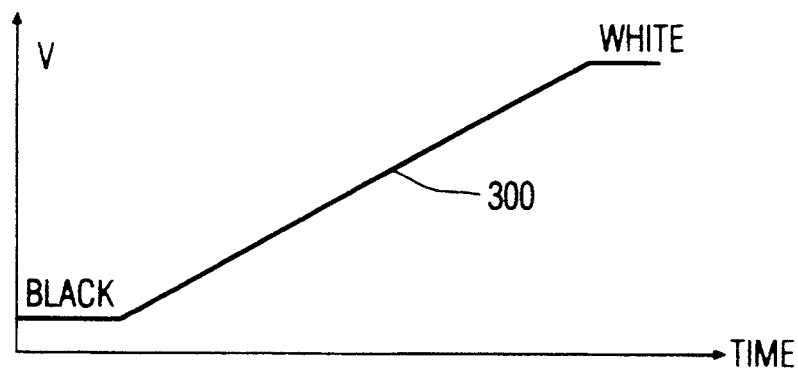
FIGS. 3–5 are transfer function diagrams illustrating low frequency response characteristics of the processors of FIGS. 1 or 2.
Figure 4:
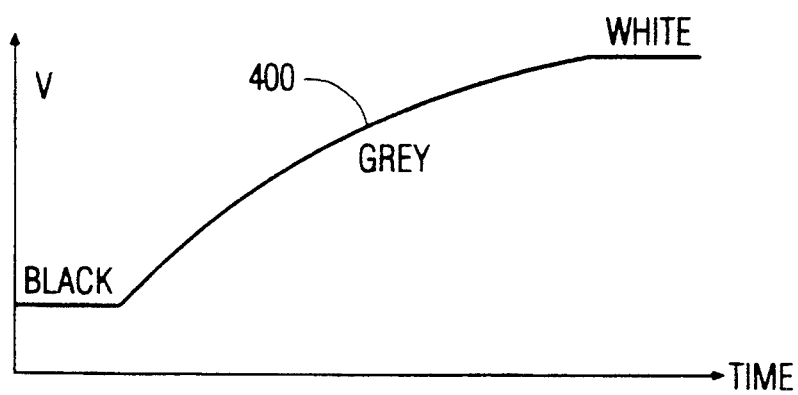

As an illustration of the operation discussed above, FIG. 3 illustrates a ramp video input signal 300 making a black to white transition. In FIG. 4 the waveform 400 illustrates the voltage at the central node 14 caused by the attenuation (impedance) change of the non-linear function network 20. As seen, the voltage initially follows the input signal (FIG. 3) in the black to gray region but as the input signal goes from gray to white the rate of change of the node 14 voltage decreases. This results because at the higher levels the impedance of the network is decreasing and so more and more of the input current is shunted to ground.

Figure 5:
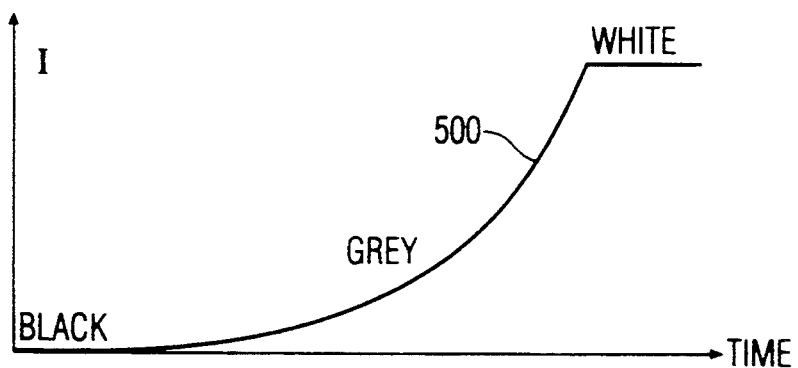

FIG. 5 illustrates the waveform 500 of the shunt current S4 flowing through the non-linear network 20. It will be noted that this current increases as an exponential function of the input signal. By sensing the shunt current S4 in network 20 (e.g., by a resistor) a video signal S3 is produced that is suitable (as a starting point) for enhancing the high frequency detail of the processed output signal This is done, as shown in FIG. 1, by high pass filtering the signal S3 and applying the filtered signal S5 along with the gamma corrected signal S7 to a combiner (e.g., an adder) 18 for producing the processed video output signal S2. To avoid adverse noise effects in the high frequency detail signal S5 one may, if desired, apply the signal to a coring circuit 26 to achieve noise reduction.

Figure 6:
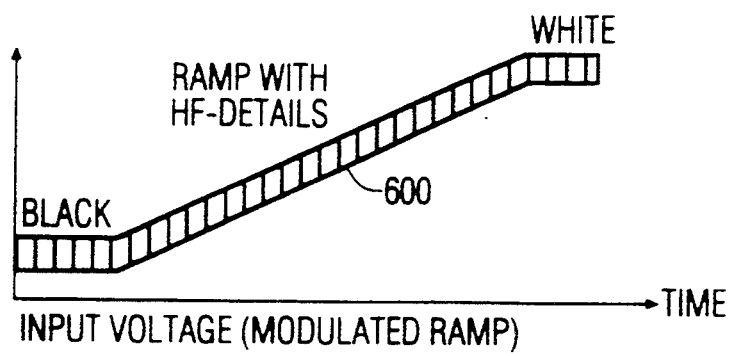
FIGS. 6–9 are transfer function diagrams illustrating high frequency response characteristics of the processors of FIGS. 1 or 2.
Figure 7:
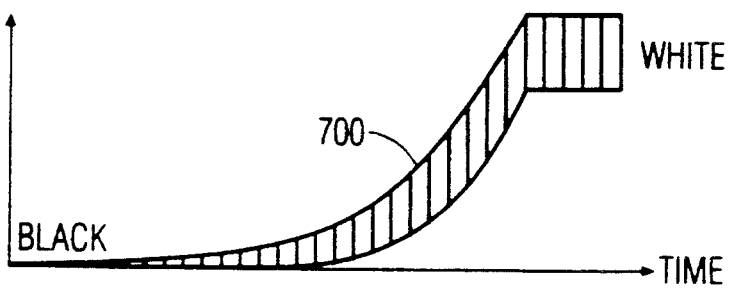
Figure 8:
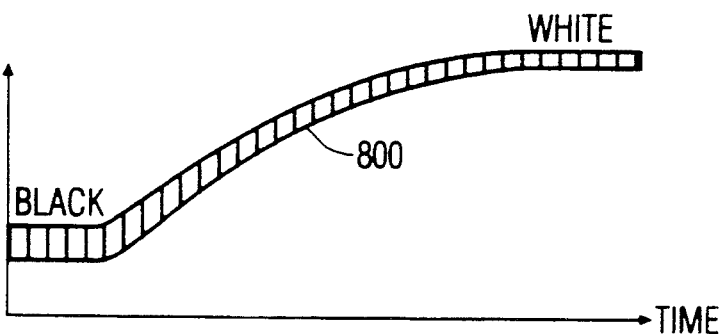
Figure 9:
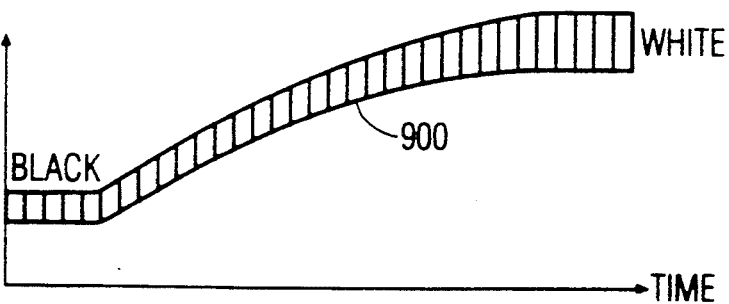

Some of the more salient features of using the non-linear network 20 for the additional function of high frequency detail augmentation are illustrated in FIGS. 6–9. FIG. 6 corresponds to FIG. 3 but illustrates the black to white ramp input signal 600 as also including high frequency (HF) details. FIG. 7 illustrates the sensed voltage S3 proportional to the current though the shunt branch of the attenuator. As shown, the increase in detail exhibits an exponential relationship with the video input signal with the detail being enhanced at higher input signal levels. Waveform 800 of FIG. 8 illustrates the effect of detail on the output signal with only the output signal S7 of the bridge used and with the augmentation signal S3 disabled. As seen, the processed signal clearly is gamma corrected but the detail shows little effect. When the detail signal S3 is enabled the effect, as shown by waveform 900 in FIG. 9, is a substantial increase in detail in the gray to white video signal levels.

Figure 2:
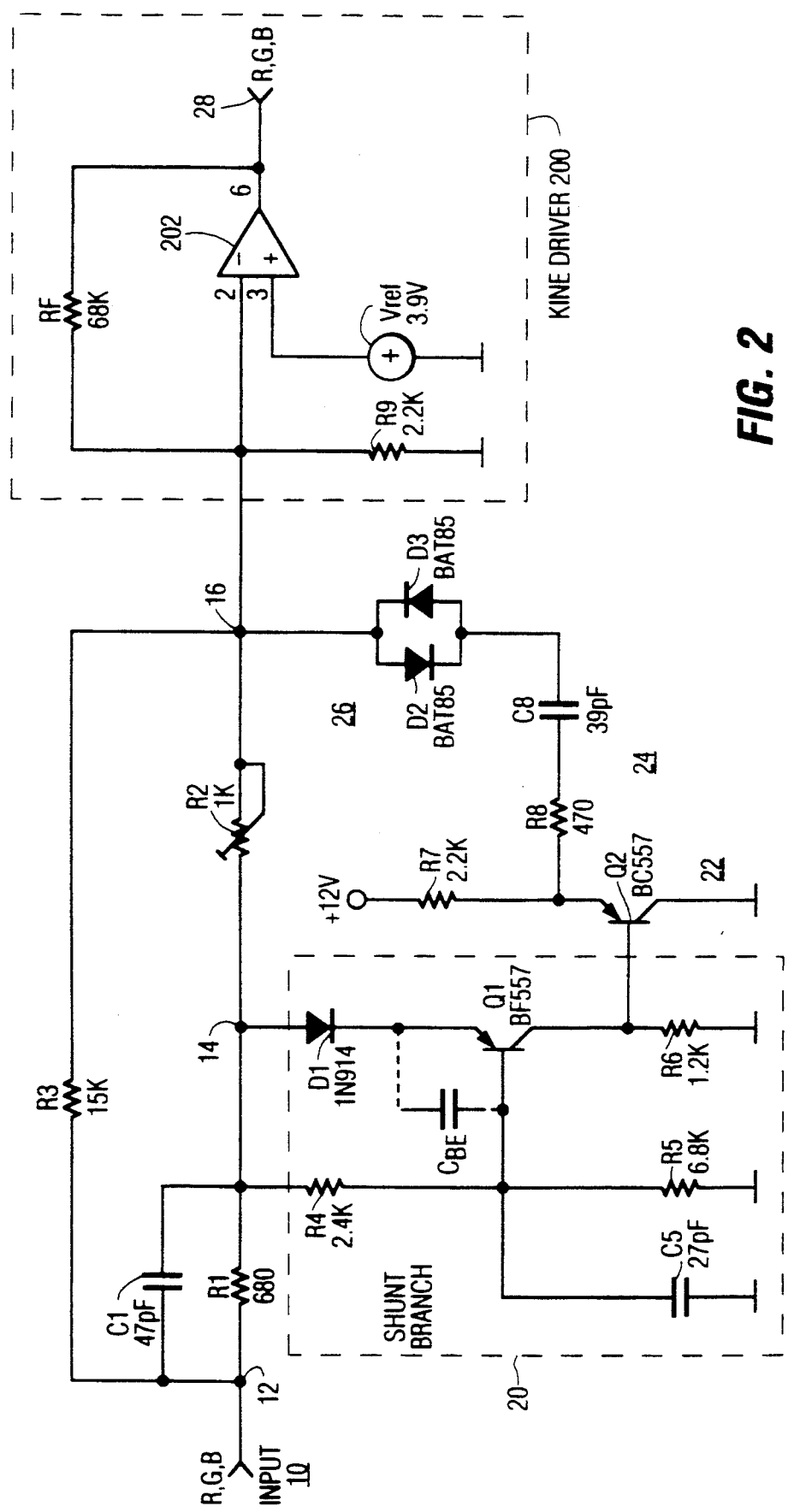
FIG. 2 is a detailed circuit diagram with exemplary component values of the processor of FIG. 1.

FIG. 2 provides an exemplary implementation of the video signal processor of FIG. 1. The example of FIG. 2 also includes additional advantageous features for enhancing the performance and reducing the number of circuit elements for implementing the non-linear video signal processor. These include:

(1) frequency compensation of the bridged-T shunt branch;
(2) manual gain "T" branch gain control; and
(3) elimination of the need for a separate combiner circuit for the gamma corrected and detail signals.

In more detail, in FIG. 2 the bridged-T attenuator comprises resistors R1, R2 and R3 connected as previously described. The non-linear network 20, illustrated in phantom, comprises a PNP transistor Q1 having a conduction path coupled at the emitter end to the central node 14 via a diode D1 and coupled at the collector end to ground via a current sensing resistor R6. Bias for application to the control electrode (base) of transistor Q1 is provided by the attenuated video signal appearing at the central node 14 by means of a potential divider comprising resistors R4 and R5 coupled between node 14 and a reference potential point (ground).

In operation of the non-linear network, the transistor Q1 in combination with diode D1 and resistors R4 and R5, acts as a current sink when the input signal level causes Q1 to conduct. With a linear increase of the input voltage (FIG. 3), the current through diode D1 and transistor Q1 increases exponentially (FIG. 5) while the current through resistor R2 decreases by the same amount, resulting in a smooth gamma correction (FIG. 4).

The voltage divider comprising resistors R4 and R5 determines the emitter current and operating point of transistor Q1. Diode D1 is not strictly necessary. However the presence of diode D1 advantageously doubles the voltage across resistor R4 for a particular emitter current and provides a more convenient ratio for the values of resistors R4 and R5. Together with the base-emitter capacitance of transistor Q1, which is quite high in the cut-off region, capacitors C1 (parallel with resistor R1) and C5 (parallel with resistor R5) provide the advantage of making the voltage divider frequency independent.

When transistor Q1 is not in saturation, the emitter current rises exponentially with a linearly increasing input voltage. Thus, the voltage across resistor R6 varies in the same manner (FIG. 5). This signal is buffered by transistor Q2 which with resistor R7 serves as an emitter follower. The buffered signal is coupled to the input of a high pass filter. The filter comprises resistor R8 and capacitor C8 and has a cut-off frequency, illustratively, of about 8 MHz providing a linear phase behavior at lower frequencies (e.g., in the video frequency range).

As noted above, in this example of the invention no separate adder is required for summing the gamma corrected and high pass filtered detail signals. Instead, this function is performed by a kinescope driver amplifier 200 having a non-inverting input (+) coupled to a source of reference potential (Vref.), having an inverting input terminal (−) coupled via a feedback resistor RF to an output terminal 28 and coupled also to a point of reference potential (ground) via a resistor R9. Since the amplifier 202 has negative feedback provided by feedback resistor RF, the inverting input (−) acts as a current summing node for all the currents provided by resistors R2 and R3 of the bridged-T attenuator and the current passed by the high pass filter (R8, C8). In effect, the kinescope driver amplifier, in this example of the invention, serves the dual functions of both amplifying the video signal for application to a kinescope gun and for summing the three currents of the non-linear video signal processor.

As noted above, a further feature of this embodiment of the invention concerns the provision for manual gain control. This is provided for in FIG. 2 by use of a manually variable resistor (potentiometer) for resistor R2 in the T-attenuator portion of the bridged-T attenuator. This control is useful for providing a balance adjustment for R, G, B drive signals in applications where a separate non-linear processor is provided for each gun of a color television receiver.

In applying the principles of the invention in a specific application, it is preferred that the non-linear processing be applied to color component signals such as, for example, red, blue and green. However, in a given application one may wish, instead, to apply the non-linear processing to a luminance signal. It should be noted, however, that gamma correction in a luminance signal path may lead to desaturation of colors.

What is claimed is:

1. Video signal processing apparatus for providing gamma correction and detail enhancement, comprising:
   a source for providing a video input signal to be processed;
   a summing circuit having an output for providing a processed video output signal:
   an attenuator having a series branch and a shunt branch, each said branch for coupling said video input signal to said summing circuit;
   said shunt branch including a non-linear element providing attenuation as a direct function of the level of said video input signal; and wherein:
   said shunt branch includes a signal amplitude sensing element providing a sensed video signal exponentially related to the video input signal;
   a high pass filter is coupled to said sensing element and responsive to the sensed video signal for providing a high frequency boosted detail signal; and
   means for applying said detail signal to said summing circuit for enhancing high frequency detail of said gamma corrected video output signal.

2. Video signal processing apparatus as recited in claim 1 further comprising coring means coupled in series with said high pass filter.

3. Video signal processing apparatus for providing gamma correction and detail enhancement, comprising:
   a source for providing a video input signal to be processed;
   a summing circuit having an output for providing a processed video output signal:
   an attenuator having a series branch and a shunt branch, each said branch for coupling said video input signal to said summing circuit;
   said shunt branch including a non-linear element providing attenuation as a direct function of the level of said video input signal; and wherein;
   said shunt branch includes a circuit node coupled to an input of said attenuator via a first resistor and coupled to an output of said attenuator via a second resistor; a transistor having a conduction path coupled at a first end thereof to said circuit node and coupled at a second end thereof to a source of reference potential; and a bias circuit coupled to said circuit node and to said source of reference potential for producing turn-on bias for said transistor.

4. Video signal processing apparatus as recited in claim 3 further comprising a further resistor for coupling said second end of said conduction path of said transistor to said source of reference potential for sensing current flow in said path and producing a voltage proportional to the sensed current.

5. Apparatus, comprising:
   a bridged-T attenuator including an input node and an output node;
   first and second resistors coupled in series between said input and output nodes;
   a third resistor coupled between said nodes;
   a transistor having a control electrode coupled to a source of bias, having a conduction path coupled between a junction of said first and second resistors and a first end of a fourth resistor having a second end coupled to a source of reference potential; and
   means for applying a video input signal to said input node for producing at said output node a gamma corrected first video output signal and for producing across said fourth resistor a second video output signal having an amplitude proportional to a current conducted by said transistor.

6. Video signal processing apparatus, comprising:
   a source for providing a video signal to be processed;
   a first circuit for applying gamma correction to said video signal
   a second circuit for boosting high frequency detail of said video signal at relatively high signal levels;
   a summing circuit for summing said gamma corrected signal, said boosted detail signal and said video input signal to form a processed video output signal;
   said first circuit comprising a bridged-T attenuator having a series branch and having a shunt branch, said shunt branch including a non-linear element for causing said attenuator to provide increasing attenuation to said video input signal as said input signal increases to generate said gamma corrected signal; and
   said second circuit comprises (i) a current sensing circuit for sensing current conducted by said shunt branch and (ii) a high pass filter responsive to the sensed current for producing said boosted detail signal.

7. Video signal processing apparatus, comprising:
   a source for providing a video input signal to be processed;
   an attenuator having a non-linear shunt branch for attenuating said video input signal as a function of the level of said video input signal for producing a gamma corrected video output signal;
   a current sensing circuit coupled to said non-linear shunt: branch of said attenuator for providing a video signal which increases with the level of said video input signal;
   a high pass filter coupled to said current sensing circuit for providing a high frequency boosted detail signal; and
   output means for summing said video input signal, said gamma corrected video signal, said high frequency boosted detail signal for producing a processed video output signal.

8. A method for applying gamma correction and high frequency detail augmentation to a video input signal, comprising:
   attenuating said video input signal as a function of the level of said video input signal for producing a gamma corrected video output signal;
   sensing a parameter of said video input signal for generating a detail indicating video signal having an amplitude which increases as a non-linear function of the level of said video input signal;
   high pass filtering said detail indicating signal for providing a high frequency boosted detail signal; and
   summing said video input signal, said gamma corrected video signal and said high frequency boosted detail signal for producing a processed video output signal having gamma correction and high frequency boosted detail.

9. Apparatus for applying gamma correction and high frequency detail augmentation to a video input signal, comprising:

means for attenuating said video input signal as a function of the level of said video input signal for producing a gamma corrected video output signal;

means for sensing a parameter of said video input signal for generating a detail indicating video signal having an amplitude which increases as a non-linear function of the level of said video input signal;

means for high pass filtering said detail indicating signal for providing a high frequency boosted detail signal; and means for summing said video input signal, said gamma corrected video signal and said high frequency boosted detail signal for producing a processed video output signal having gamma correction and high frequency boosted detail.

10. Apparatus, comprising:

a bridged-T attenuator includes an active non-linear element in a shunt branch thereof for providing increasing attenuation to a video input signal applied to an input terminal of said attenuator to produce a gamma corrected video output signal;

a current sensor in said shunt branch for generating an exponentially increasing detail signal for increases in said video input signal;

a filter for high pass filtering said detail signal; and a combiner for combining the high pass filtered detail signal with said gamma corrected signal for providing a video output signal having gamma correction and high frequency detail augmentation.

11. Apparatus, comprising:

a bridged-T attenuator having an input for receiving a video input signal and having an output for providing a variably attenuated video signal, said bridged-T attenuator having a shunt branch including a non-linear network for controlling said attenuation;

said non-linear network having a voltage response selected for increasing the bridged-T attenuation as a function of the amplitude of the video input signal so as to provide gamma correction to said video output signal;

said non-linear network including a current responsive sensor for providing a sensed video signal exponentially related to the amplitude of said video input signal; and circuit means for combining said said variably attenuated video signal and said sensed video signal to form a processed video output signal having gamma correction and high frequency detail enhancement.

* * * * *